(12) United States Patent
Weisbrod et al.

(10) Patent No.: US 11,510,057 B2
(45) Date of Patent: Nov. 22, 2022

(54) SYSTEMS AND METHODS FOR DETECTING A WIRELESS COMMUNICATION REPEATER

(71) Applicant: Verizon Patent and Licensing Inc., Basking Ridge, NJ (US)

(72) Inventors: Fred Weisbrod, Renton, WA (US); Corey J. Christopherson, Bainbridge Island, WA (US); Donna L. Polehn, Mercer Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 77 days.

(21) Appl. No.: 17/247,313

(22) Filed: Dec. 7, 2020

(65) Prior Publication Data
US 2022/0182830 A1   Jun. 9, 2022

(51) Int. Cl.
*H04W 12/08* (2021.01)
*H04W 16/26* (2009.01)
*H04W 64/00* (2009.01)

(52) U.S. Cl.
CPC .......... *H04W 12/08* (2013.01); *H04W 16/26* (2013.01); *H04W 64/003* (2013.01)

(58) Field of Classification Search
CPC ... H04W 12/08; H04W 16/26; H04W 64/003; H04W 12/63; H04W 4/02; H04W 4/023; H04W 4/025; H04W 4/029; H04W 8/10; H04W 8/12
See application file for complete search history.

(56) References Cited

U.S. PATENT DOCUMENTS

| 2019/0373417 A1* | 12/2019 | Qi | H04W 4/029 |
| 2021/0153158 A1* | 5/2021 | Agarwal | G01S 5/02216 |

* cited by examiner

*Primary Examiner* — Wayne H Cai

(57) ABSTRACT

A device may receive a wireless communication that is provided to a wireless network by a user equipment. The device may identify a value of a parameter of the wireless communication. The device may obtain an expected value of the parameter. The device may compare the value and the expected value. The device may determine, based on comparing the value and the expected value, that the wireless communication was relayed by a wireless communication repeater. The device may determine that the wireless communication repeater is unauthorized to relay the wireless communication. The device may perform an action associated with the wireless communication repeater relaying the wireless communication and based on the wireless communication repeater being unauthorized to relay the wireless communication.

20 Claims, 8 Drawing Sheets

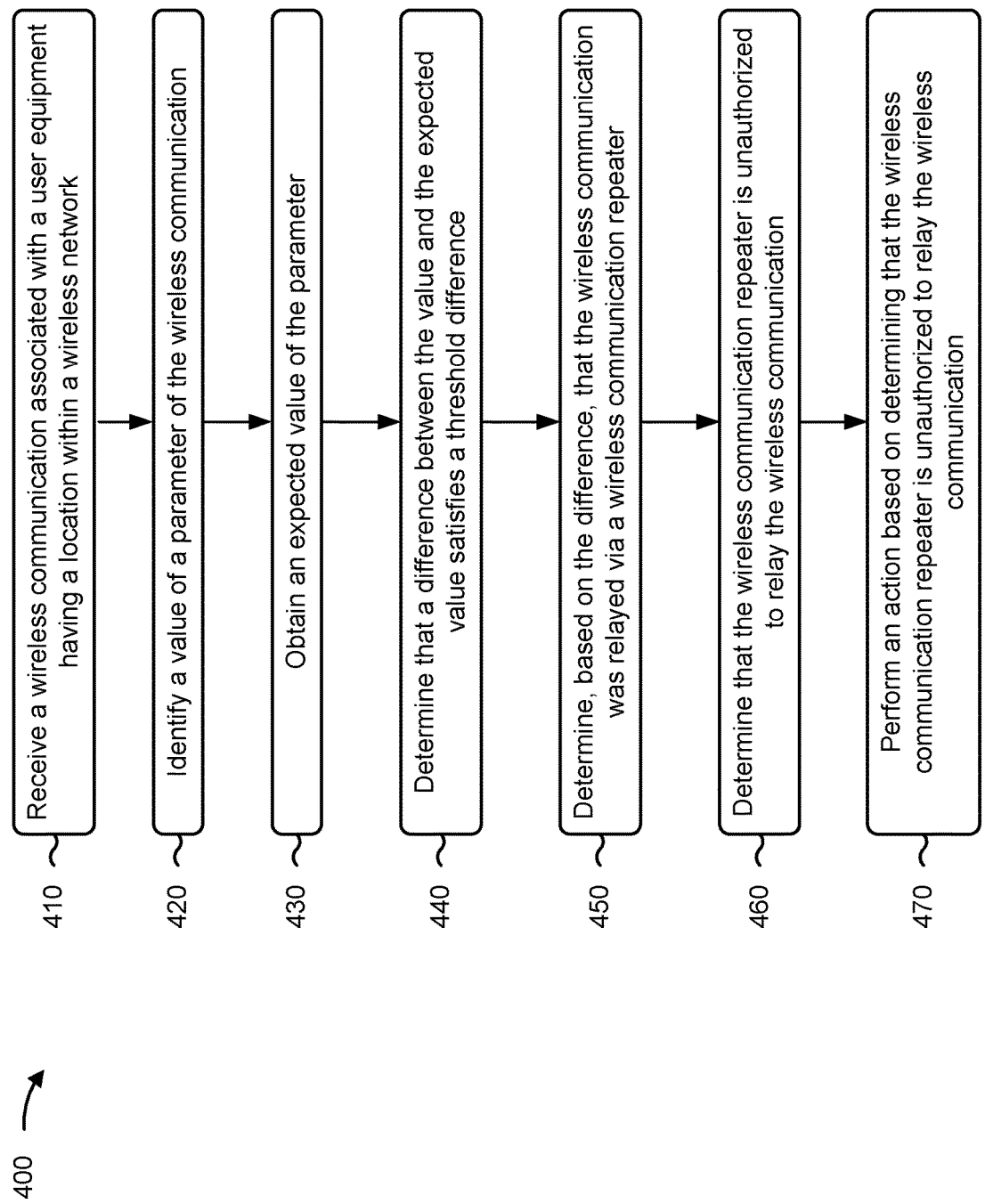

SYSTEMS AND METHODS FOR DETECTING A WIRELESS COMMUNICATION REPEATER

BACKGROUND

A user equipment may connect to a base station for the purpose of receiving data from and transmitting data to the base station. In some instances, the user equipment may connect to a device that emulates a base station and may transmit data to the device.

BRIEF DESCRIPTION OF THE DRAWINGS

FIG. 4 is a flowchart of an example process relating to detecting a wireless communication repeater.

DETAILED DESCRIPTION OF PREFERRED EMBODIMENTS

Figure 1A:
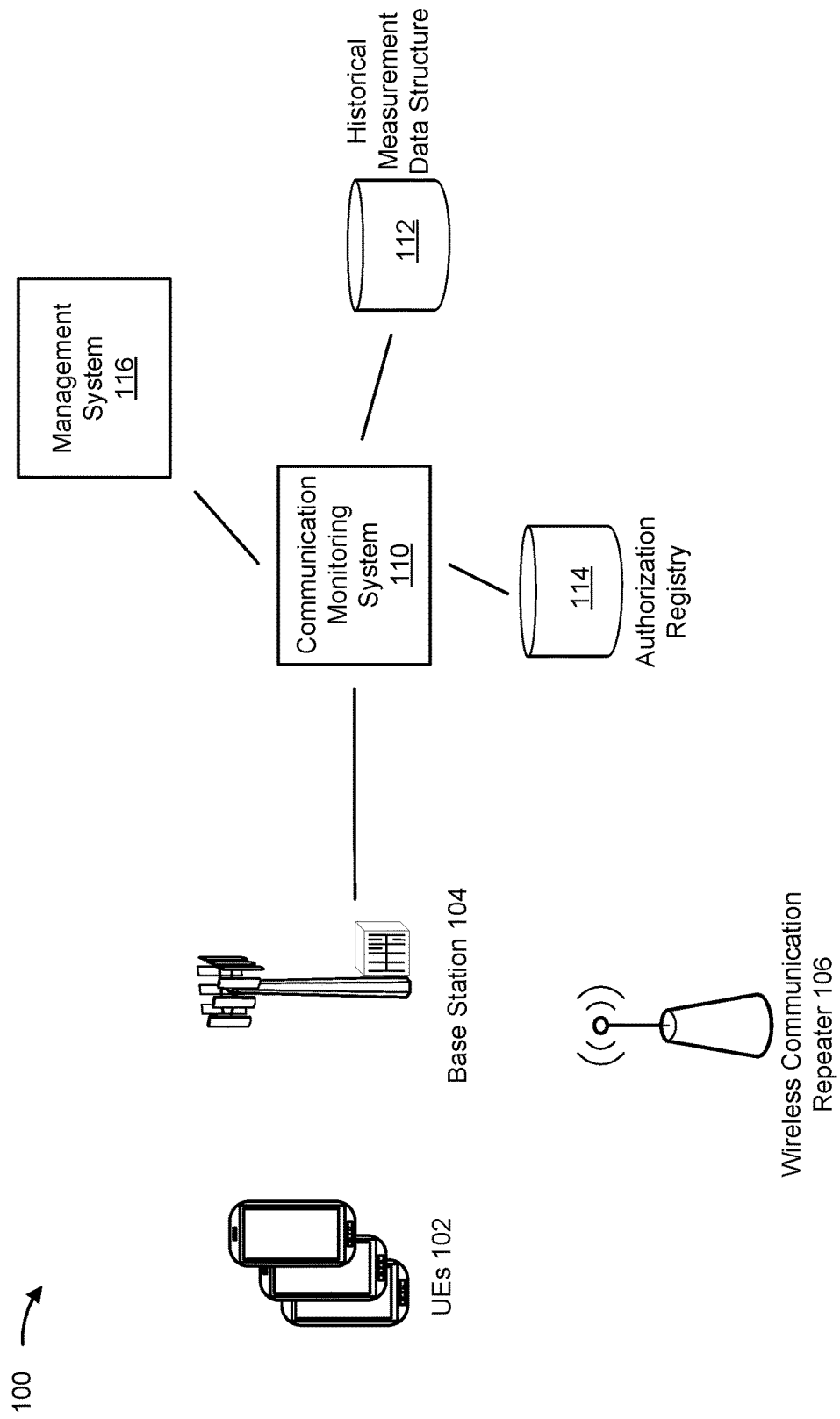
FIGS. 1A-1E are diagrams of an example associated with detecting a wireless communication repeater.

The following detailed description of example implementations refers to the accompanying drawings. The same reference numbers in different drawings may identify the same or similar elements.

A user equipment may connect to a base station for the purpose of receiving data from and transmitting data to the base station. In some instances, an unauthorized wireless communication repeater may broadcast (e.g., in a geographical area) signals that are (or appear to be) stronger than signals broadcasted (e.g., in the geographical area) by the base station. A wireless communication repeater (or simply "repeater"), as used herein, may refer to a device that emulates a base station (e.g., a cell site simulator commonly known as a Stingray device). Based on the strength of the signals broadcasted by the unauthorized wireless communication repeater, the user equipment (when located in the geographical area) may connect to the unauthorized wireless communication repeater (instead of connecting to the base station).

After the connection, the wireless communication repeater may surreptitiously obtain data from the user equipment by causing the user equipment to transmit the data to the wireless communication repeater. The data may include personal data. The personal data may include historical data and/or current data such as historical and/or current location data of the user equipment, historical and/or current call data of the user equipment, historical and/or current text messaging data of the user equipment, historical and/or current passwords, other historical and/or current personal data, and/or information identifying the user equipment (e.g., international mobile subscriber identity (IMSI) and/or international mobile equipment identity (IMEI)). In some instances, the wireless communication repeater may provide the data to a device (e.g., a laptop or a desktop) connected to the wireless communication repeater and may also provide the data to a base station located in the geographical area.

Wireless communication repeaters were originally intended to be available to members of law enforcement agencies for use in law enforcement activities. Unauthorized use of wireless communication repeaters creates data security concerns. Additionally, use of unauthorized or unplanned wireless communication repeaters degrades network performance.

Some implementations described herein enable network based detection of unauthorized use of a wireless communication repeater. For example, a device may receive a wireless communication associated with a user equipment. The user equipment may be located within a wireless network. The device may identify a value of a parameter of the wireless communication. The device may compare the value of the parameter with an expected value of the parameter.

The device may determine, based on comparing the value and the expected value, a probability that the wireless communication was relayed from a repeater that received the wireless communication from the user equipment and not from an authorized device within the network. The device may determine that the wireless communication was relayed from a repeater, that the repeater is unauthorized to relay the wireless communication. The device may perform an action to mitigate or obviate the repeater based on the wireless communication repeater being unauthorized to relay the wireless communication. By detecting unauthorized use of the wireless communication repeater, the device may preserve computing resources, network resources, and/or other resources that would have otherwise been used to recover personal data, to protect personal data, and/or to restore network performance.

FIGS. 1A-1E are diagrams of an example 100 associated with detecting a wireless communication repeater. As shown in FIG. 1A, example 100 includes a plurality of user equipment (UEs) 102 (referred to collectively as "UEs 102" and individually as "UE 102"), a base station 104, a wireless communication repeater 106, a communication monitoring system 110, a historical measurement data structure 112, an authorization registry 114, and a management system 116. In some implementations, the communication monitoring system 110, the historical measurement data structure 112, the authorization registry 114, and the management system 116 may be part of a multi-access edge computing (MEC) environment and may be associated with a wireless network. In some implementations, the communication monitoring system 110, the historical measurement data structure 112, the authorization registry 114, and the management system 116 may be part of existing core networking equipment. The UEs 102, the base station 104, the wireless communication repeater 106, the communication monitoring system 110, and the management system 116 are described in more detail below in connection with FIG. 2.

A UE 102 may include a stationary or mobile user device. The base station 104 may include a network device that acts as a wireless access point for UEs 102 to the wireless network. The wireless communication repeater 106 may include a device that emulates a base station (e.g., a cell site simulator commonly known as a Stingray device). Typically, wireless communication repeater 106 devices are not authorized to operate in the wireless network. In operation, the wireless communication repeater 106 may obtain data from a UE 102 by appearing to the UE 102 as a base station 104 to which the UE 102 may transmit data intended for the wireless network. In some situations, the wireless communication repeater 106 may be authorized to obtain data from a UE 102 (e.g., may have authorized lawful purpose, such as a law enforcement purpose). In other situations, the wireless communication repeater 106 may be unauthorized to obtain data from a UE 102 (e.g., may have no authorized purpose, such as a nefarious purpose). The communication monitoring system 110 may include one or more devices that determine whether there is a wireless communication repeater operating in a cell of the base station 104.

The historical measurement data structure 112 may include a data structure (e.g., a database, a table, and/or a linked list) that stores information identifying historical locations in association with information identifying historical parameters for wireless communications (e.g., signal strengths of wireless communications, timing advances associated with the wireless communications, or another type of wireless key performance indicator). In operation, the historical measurement data structure 112 may be used (e.g., by the communication monitoring system 110) to determine expected parameters of UEs 102 at different locations.

The authorization registry 114 may include a data structure that stores information identifying locations in association with information indicating whether the locations are associated with authorized wireless communication repeaters (e.g., authorized to be used in those locations). In operation, the authorization registry 114 may be used (e.g., by the communication monitoring system 110) to determine whether a wireless communication repeater 106 is authorized to be used at a location of the wireless communication repeater 106. The management system 116 may include a server device or a collection of server devices that are notified and/or used to take an action when an unauthorized wireless communication repeater is operating in the wireless network.

Figure 1B:
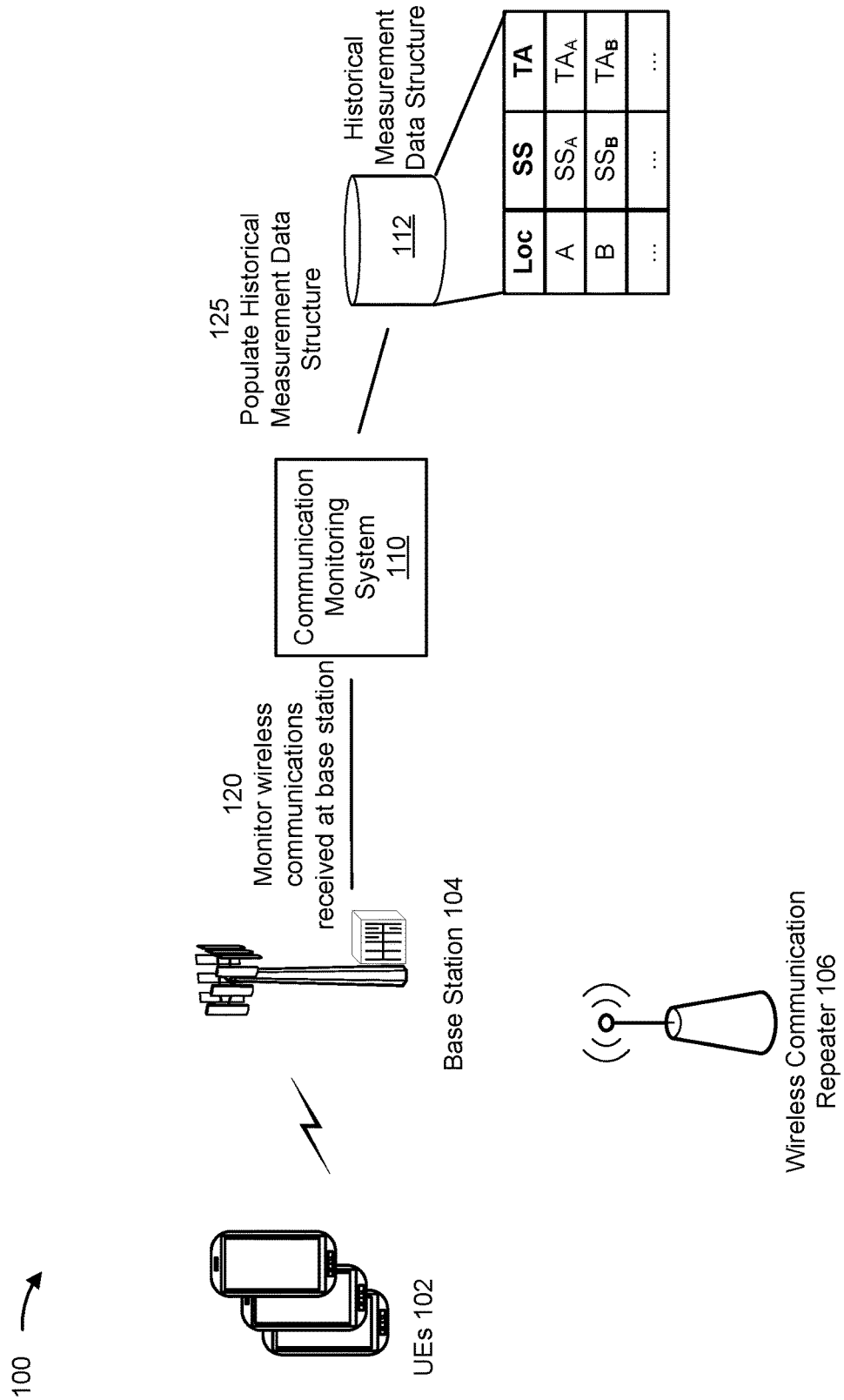

As shown in FIG. 1B, and by reference number 120, the communication monitoring system 110 may monitor wireless communications received at the base station 104. For example, the communication monitoring system 110 may be configured (e.g., by a mobile network operator of the wireless network) to receive (e.g., from one or more base stations) information regarding wireless communications between the one or more base stations and one or more UEs. For instance, the communication monitoring system 110 may be configured to receive the information regarding the wireless communications in order to detect wireless communication repeaters (e.g., detect unauthorized wireless communication repeaters).

The one or more base stations may include the base station 104 and the one or more UEs may include one or more of the UEs 102. The information regarding the wireless communications (hereinafter referred to as "wireless communications information") may include information regarding locations of the one or more UEs. Additionally, the wireless communications information may include information identifying one or more parameters of the wireless communications. In the description to follow and simply as an example, the one or more parameters will be generally described as signal strengths (e.g., signal strength measurements) of signals received by the one or more UEs (e.g., from the one or more base stations) at the locations and timing advances (e.g., timing advance measurements) associated with the signals. The description herein is not limited to signal strengths and timing advances. The description may be applicable to other parameters such as receive sensitivity of UEs and/or antenna gain of UEs.

As shown in FIG. 1B, and by reference number 125, the communication monitoring system 110 may populate the historical measurement data structure 112 with the information regarding the locations in association with information identifying expected values for the one or more parameters at the locations (referred to herein as expected parameter values). The expected parameter values may be determined using a mathematical operation on parameter values, such as using an average, a median, a moving average, a range, a ratio, or another mathematical operation performed on the parameter values.

The historical measurement data structure 112 may store information identifying a first location in association with information identifying expected signal strengths of signals received at the first location and/or information identifying expected timing advances associated with the signals received at the first location; information identifying a second location in association with information identifying expected signal strengths of signals received at the second location and/or information identifying expected timing advances associated with the signals received at the second location; and so on. In some implementations, the historical measurement data structure 112 may include a reference to a physical map of the network (e.g., may include information regarding a physical map of the network). As described in more detail below, the communication monitoring system 110 may use the information identifying expected signal strengths associated with a location and/or the information identifying expected timing advances associated with the location to detect the presence of an unauthorized wireless communication repeater in the wireless network.

As shown in FIG. 1B, the historical measurement data structure 112 may store information identifying a location A (e.g., the first location) in association with information identifying an expected signal strength $SS_A$ at the first location and information identifying an expected timing advance $TA_A$ at the first location. In some implementations, the historical measurement data structure 112 may, additionally or alternatively, store a ratio of the expected signal strength and the expected timing advance (e.g., $SS_A/TA_A$) with the information identifying the first location.

As further shown in FIG. 1B, the historical measurement data structure 112 may store information identifying a location B (e.g., the second location) in association with information identifying an expected signal strength $SS_B$ at the second location and information identifying an expected timing advance $TA_B$ at the second location. Similarly, the historical measurement data structure 112 may, additionally or alternatively, store a ratio of the expected signal strength and the expected timing advance (e.g., $SS_B/TA_B$) with the information identifying the second location. In some implementations, the first location may be associated with a first cell of the base station 104 and the second location may be associated with a second cell of the base station 104. Alternatively, the second location may be associated with a different section of the first cell.

In some implementations, the information identifying the first location may include information identifying a first portion of a grid system (e.g., a geographical grid system). For example, the information identifying the first location may include geographical coordinates associated with the first portion. Similarly, the information identifying the second location may include information identifying a second portion of the grid system (e.g., geographical coordinates associated with the second portion). In some implementations, the first portion of the grid system may include the first location, the second portion of the grid system may include the second location, and so on. In some implementations, the grid system may include previously established grid system, such as a Military Grid Reference System (MGRS) or other numerical grid systems.

In some implementations, as described above, the expected signal strength at the first location may include an average of signal strengths (e.g., of signals received by one or more UEs over a period of time) at the first location (e.g., within a grid reference) and/or the expected timing advance at the first location may include an average of timing advances at the first location over the period of time. In some implementations, the average of the signal strengths may be a moving average. For example, the communication monitoring system 110 may continuously (or regularly) determine the average of the signal strengths as the communication monitoring system 110 receives additional information identifying signal strengths provided by one or more UEs at the first location. In some implementations, the average of the timing advances may be a moving average and the communication monitoring system 110 may determine the moving average in a manner similar to the manner described above. Similarly, the expected signal strength at the second location may include an average (or moving average) of signal strengths (e.g., of signals received by one or more UEs over a period of time) at the second location and/or the expected timing advance at the second location may include an average (or moving average) of timing advances at the second location over the period of time, and so on, determined in a manner similar to the manner described above.

Figure 1C:
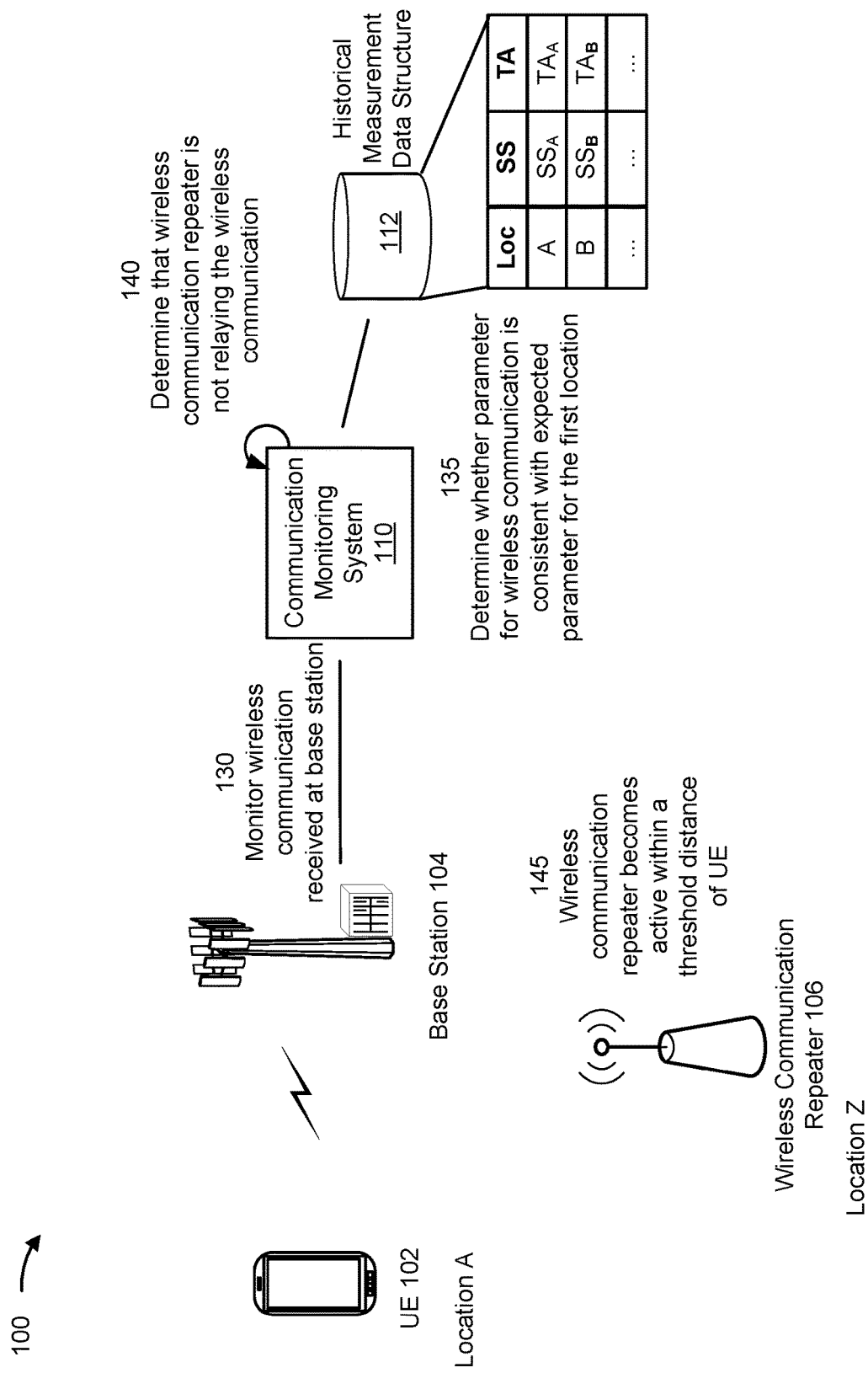

As shown in FIG. 1C, and by reference number 130, the communication monitoring system 110 may monitor wireless communications received at the base station 104. For example, the communication monitoring system 110 may receive, from the base station 104, wireless communications information regarding wireless communications between the base station 104 and a UE 102, in a manner similar to the manner described above.

As shown in FIG. 1C, the UE 102 may be located at the first location (e.g., location A). Assume that the UE 102 identifies the base station 104 as a closest base station to the UE 102 (e.g., based on signal strengths of signals received from the base station 104 at the first location). Accordingly, the UE 102 may connect to the base station 104 (e.g., the UE 102 may establish a connection with the base station 104). The first location may be associated with a first cell of the base station 104.

Based on establishing the connection with the base station 104, the UE 102 may engage in wireless communications with the base station 104. For example, as part of the wireless communications, the UE 102 may transmit data to and receive data from the base station 104. In some examples, the data (transmitted to the base station 104) may include a parameter. As described above, the parameter may indicate a signal strength of a signal received by the UE 102 (e.g., from the base station 104) at the first location and/or include a timing advance associated with the wireless communications (e.g., a timing advance associated with the signal). In other words, the parameter (included in the wireless communications) may include information identifying the signal strength and/or information identifying the timing advance. In some implementations, the parameter may be associated with an operations, administration, and management (OAM) parameter that monitors signal characteristics between the UE 102 and the base station 104. The UE 102 may transmit information regarding the parameter for OAM purposes. In some implementations, the parameter may include another type of wireless network key performance indicator or a combination of types of wireless network key performance indicators.

The data (transmitted to the base station 104) may further include information regarding the first location of the UE 102. For example, the data may include information regarding the first portion of the grid system. The information identifying the signal strength may correspond to a signal strength associated with the first portion of the grid system and the information identifying the timing advance may correspond to a timing advance associated with the first portion of the grid system.

The UE 102 may periodically transmit, to the base station 104, the information regarding the first location of the UE 102 along with one or more parameters (e.g., the information identifying the signal strength and/or the information identifying the timing advance). In some examples, the information regarding the first location of the UE 102 may include geographical coordinates of the first portion of the grid system. In some implementations, the information regarding the first location of the UE 102 along with the information identifying the signal strength and/or the information identifying the timing advance may be part of Per Call Measurement Data (PCMD) that is periodically transmitted by the UE (e.g., to the base station 104).

The base station 104 may be configured to transmit, as part of the wireless communications information, the information regarding the first location of the UE 102 along with the one or more parameters (e.g., the information identifying the signal strength and/or the information identifying the timing advance). In some implementations, the base station 104 may transmit the wireless communications information based on a trigger. For example, the base station 104 may receive a request (from the communication monitoring system 110) for the wireless communications information and the base station 104 may transmit the wireless communications information to the communication monitoring system 110 based on the trigger. Additionally, or alternatively, to transmitting the wireless communications information based on the trigger, the base station 104 may transmit the wireless communications information to the communication monitoring system 110 periodically (e.g., every second, every minute, and/or according to another time schedule).

As shown in FIG. 1C, and by reference number 135, the communication monitoring system 110 may determine whether a parameter (e.g., a single parameter of the one or more parameters or a combination of parameters of the one or more parameters) for the wireless communication is consistent with an expected parameter for the first location. For example, the communication monitoring system 110 may determine the expected parameter (e.g., the expected signal strength and/or the expected timing advance) for the first location based on receiving the wireless communications information and by performing a lookup in the historical measurement data structure 112 based on information identifying the first location. The communication monitoring system 110 may determine that the parameter for the wireless communication is consistent with an expected parameter for the first location when a value of the parameter exactly matches a value of the expected parameter, when a value of the parameter matches a value of the expected parameter within a threshold degree of similarity (e.g., matches within X %), when a value of the parameter falls within a range of values for the expected parameter, among other examples.

The communication monitoring system 110 may determine a location of the UE 102 (i.e., the first location). In some implementations, the communication monitoring system 110 may determine the location of the UE 102 based on the information identifying the first location included in the wireless communications information. Additionally, or alternatively, the communication monitoring system 110 may determine the location of the UE 102 based on the signal strength and the timing advance identified in the wireless communications information. Additionally, or alternatively, the communication monitoring system 110 may determine the location of the UE 102 based on a location of the base station 104, based on a location of one or more other base stations within a threshold distance of the location of the base station 104, and/or based on a triangulation algorithm using the location of the base station 104 and the location of the one or more other base stations.

The communication monitoring system 110 may search the historical measurement data structure 112 (e.g., using the information identifying the first location) to identify a value of the expected parameter for the first location. The communication monitoring system 110 may determine a difference between a value of the expected parameter and the value of the parameter included in the wireless communications information. For example, the communication monitoring system 110 may determine a signal strength difference between the signal strength (identified in the wireless communication information) and the expected signal strength for the first location. The communication monitoring system 110 may compare the signal strength difference with a signal strength difference threshold to determine whether the signal strength (identified in the wireless communication information) is consistent with the expected signal strength for the first location. Additionally, or alternatively, to the communication monitoring system 110 determining the signal strength difference, the communication monitoring system 110 may determine a timing advance difference between at the timing advance (identified in the wireless communication information) and the expected timing advance for the first location (or between a timing advance distance associated with the timing advance and an expected timing advance distance associated with the expected timing advance). The communication monitoring system 110 may compare the timing advance difference with a timing advance difference threshold to determine whether the timing advance (identified in the wireless communication information) is consistent with the expected timing advance for the first location.

In addition to communication monitoring system 110 determining the signal strength difference and/or the timing advance difference, the communication monitoring system 110 may determine a ratio difference between a measured ratio of the signal strength and the timing advance and the expected ratio of the expected signal strength and the expected timing advance for the first location. The communication monitoring system 110 may compare the ratio difference with a ratio difference threshold to determine whether the ratio difference is consistent with the expected ratio difference for the first location.

In some implementations, one or more of the thresholds described above may be determined by the mobile network operator (e.g., manually). Additionally, or alternatively, one or more of the thresholds may be determined by the communication monitoring system 110 based on historical data such as historical measurements of the parameter stored in the historical measurement data structure 112 (e.g., determined automatically or, in other words, determined without human intervention). Additionally, or alternatively, one or more of the thresholds may be based on environmental characteristics at a location. For example, a threshold may be a first threshold value for a location associated with flat land, may be a second threshold value for a location associated with hills, may be a third threshold value for a location associated with mountains, may be a fourth threshold value for a location associated with trees, among other examples.

As shown in FIG. 1C, and by reference number 140, the communication monitoring system 110 may determine that a wireless communication repeater is not relaying the wireless communication from the UE 102. When the parameter for the wireless communication is consistent with the expected parameter for the first location, this is a signal that the wireless communication, from the UE 102, is not being relayed by a wireless communication repeater. Conversely, when the parameter for the wireless communication is inconsistent with the expected parameter for the first location, this is a signal that the wireless communication, from the UE 102, may be being relayed by a wireless communication repeater. Thus, the communication monitoring system 110 may determine, in this example, that a wireless communication repeater is not relaying the wireless communication from the UE 102 because the value of the parameter for the wireless communication is consistent with the value of the expected parameter for the first location.

In this situation, the communication monitoring system 110 may update the historical measurement data structure 112 with the parameter. For example, when the historical measurement data structure 112 stores expected parameters that are moving averages of historical parameters, the communication monitoring system 110 may update the moving average of the expected parameter for the first location.

As shown in FIG. 1C, and by reference number 145, a wireless communication repeater 106 may become active within a threshold distance of the UE 102. For example, the wireless communication repeater 106 may move from an original location to a destination location (e.g., location Z). Assume that the destination location is within the threshold distance of the first location (e.g., location A) and is within communication range of the base station 104 (e.g., located with a cell of the base station 104, which can be the same or different from the cell in which the UE 102 is located). As another example, the wireless communication repeater 106 may already be located at the destination location and, therefore, does not move to the destination location. In this example, the wireless communication repeater 106 may change from a deactive state to an active state (e.g., goes from powered down to powered up, goes from a non-operating state to an operating state, among other examples). As yet another example, the wireless communication repeater 106 may already be in the active state and may already be located at the destination location. In this example, the UE 102 may be a mobile UE 102 that moves within the threshold distance of the destination location of the wireless communication repeater 106.

The wireless communication repeater 106 may be located at the destination location for the purpose of intercepting/receiving wireless communications from UEs (including the UE 102) at the first location (and/or from UEs within a threshold distance of the destination location). In some implementations, the wireless communication repeater 106 may be located in a communication path between the base station 104 and the UE 102 when the wireless communication repeater 106 is located at the destination location.

Figure 1D:
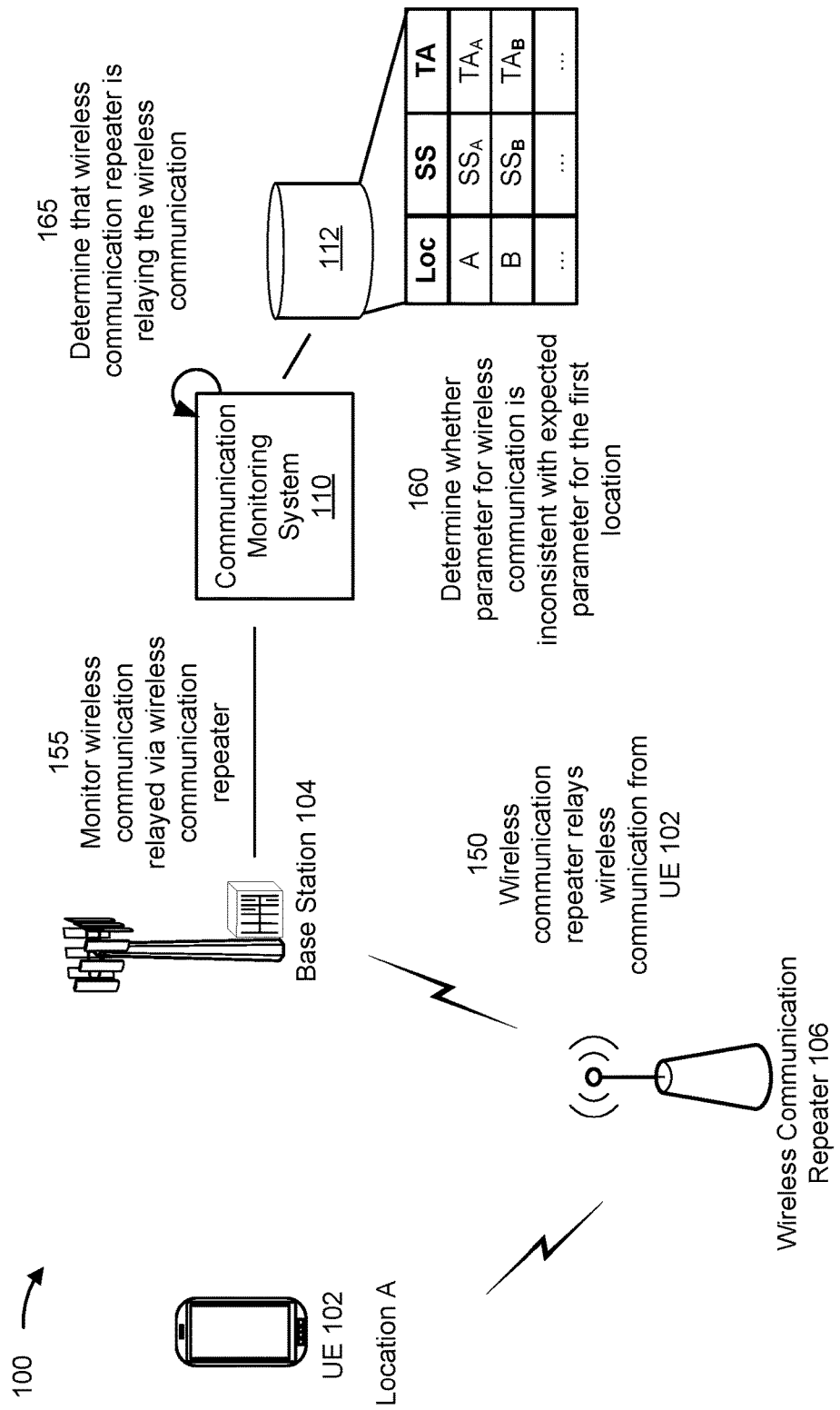

As shown in FIG. 1D, and by reference number 150, the wireless communication repeater 106 may relay a wireless communication from the UE 102. For example, the wireless communication repeater 106 may receive a wireless communication that is transmitted by the UE 102 and may forward the wireless communication to the base station 104. Prior to forwarding the wireless communication to the base station 104, the wireless communication repeater 106 may copy the wireless communication, may store the wireless communication, may analyze the wireless communication, or may perform one or more other operations on the wireless communication.

The wireless communication repeater 106 may cause the UE 102 to connect to the wireless communication repeater 106. For example, the wireless communication repeater 106 may broadcast signals that are stronger than signals transmitted by the base station 104. The UE 102 may switch from connecting to the base station 104 to connecting to the wireless communication repeater 106 based on the strength of the signals broadcasted by the wireless communication repeater 106 being stronger than the strength of the signals transmitted by the base station 104.

After connecting to the wireless communication repeater 106, the wireless communication repeater 106 may receive the wireless communication transmitted by the UE 102. The wireless communication may include information identifying the UE 102 (e.g., international mobile subscriber identity (IMSI) and/or International Mobile Equipment Identity (IMEI)), current and historical location data of the UE 102, current and historical calls data of the UE 102, current and historical text messaging data of the UE 102, current and historical passwords, and/or other current or historical data of the UE 102. The wireless communication may further include the information identifying the first location (as described above), information identifying one or more parameters (e.g., a signal strength of a signal received by the UE 102 (e.g., from the wireless communication repeater 106) at the first location and/or information identifying a timing advance associated with the first location).

After receiving the wireless communication transmitted by the UE 102, the wireless communication repeater 106 may obtain, from the wireless communication, user equipment information that includes the information identifying the UE 102, the current and historical location data of the UE 102, the current and historical calls data of the UE 102, the current and historical text messaging data of the UE 102, and/or the other current or historical data of the UE 102. The wireless communication repeater 106 may cause the user equipment information to be stored by a device (e.g., a laptop, a desktop, and/or a similar device) connected to the wireless communication repeater 106. In some instances, the wireless communication repeater 106 may use cryptographic algorithms (e.g., encryption and/or decryption algorithms) to obtain the user equipment information. After obtaining and/or storing the user equipment information, the wireless communication repeater 106 may provide (e.g., forward) the wireless communication to the base station 104.

As shown in FIG. 1D, and by reference number 155, the communication monitoring system 110 may monitor the wireless communication relayed via the wireless communication repeater 106. For example, the communication monitoring system 110 may receive, from the base station 104, information regarding the wireless communication provided (by the wireless communication repeater 106) to the base station 104. Similar to that described above, the information regarding the wireless communication may include the information regarding the first location of the UE 102 along with the one or more parameters (e.g., the information identifying the signal strength and/or the information identifying the timing advance).

As shown in FIG. 1D, and by reference number 160, the communication monitoring system 110 may determine whether a parameter (e.g., a single parameter of the one or more parameters or a combination of parameters of the one or more parameters) for the wireless communication is consistent with an expected parameter for the first location. For example, the communication monitoring system 110 may determine the expected parameter (e.g., the expected signal strength, the expected timing advance, the ratio of the expected signal strength and the expected timing advance, among other examples) for the first location based on receiving the wireless communications information and by performing a lookup in the historical measurement data structure 112 based on information identifying the first location, as described above.

The communication monitoring system 110 may determine a location of the UE 102 (i.e., the first location). In some implementations, the communication monitoring system 110 may determine the location of the UE 102 in a manner similar to that described above.

The communication monitoring system 110 may search the historical measurement data structure 112 (e.g., using the information identifying the first location) to identify a value of the expected parameter for the first location. The communication monitoring system 110 may determine a difference between a value of the expected parameter and the value of the parameter included in the wireless communications information in a manner similar to that described above. The communication monitoring system 110 may compare the difference with a difference threshold to determine whether the value of the parameter is consistent with the value of the expected parameter for the first location. Assume, for this example, that the value of the parameter is inconsistent with the value of the expected parameter for the first location.

As shown in FIG. 1D, and by reference number 165, the communication monitoring system 110 may determine that a wireless communication repeater is relaying the wireless communication from the UE 102. As described above, when the parameter for the wireless communication is inconsistent with the expected parameter for the first location, this is a signal that the wireless communication, from the UE 102, is being relayed by a wireless communication repeater. Thus, the communication monitoring system 110 may determine, in this example, that a wireless communication repeater is relaying the wireless communication from the UE 102 because the value of the parameter for the wireless communication is inconsistent with the value of the expected parameter for the first location. For example, the communication monitoring system 110 may detect that the wireless communication repeater 106 is relaying the wireless communication of the UE 102 when the signal strength difference does not satisfy the signal strength difference threshold, when the timing advance difference does not satisfy the timing advance difference threshold, when the ratio difference does not satisfy the ratio difference threshold, among other examples.

The timing advance distance (discussed above) may correspond to a timing advance distance between the UE 102 and the base station 104. In some implementations, the communication monitoring system 110 may monitor, in real time or near real time, changes to the timing advance distance (between the UE 102 and the base station 104) to detect that the wireless communication repeater 106 is relaying the wireless communication of the UE 102. For example, the communication monitoring system 110 may detect that the wireless communication repeater 106 is relaying the wireless communication of the UE 102 when the communication monitoring system 110 detects changes to the timing advance distance (between the UE 102 and the base station 104) without detecting changes to the base station 104. For example, the communication monitoring system 110 may detect that the wireless communication repeater 106 is relaying the wireless communication of the UE 102 when the changes satisfy a change threshold and when the communication monitoring system 110 has not received (e.g., from a device associated with the mobile network operator) information indicating changes to the base station 104.

In some implementations, the communication monitoring system 110 may determine whether a new base station has been deployed at the first location when the thresholds are satisfied, prior to determining that the wireless communication repeater 106 is relaying the wireless communication of the UE 102. For example, the communication monitoring system 110 may search a base station data structure (e.g., associated with the mobile network operator) to determine whether a new base station has been deployed at the first location. In some instances, the communication monitoring system 110 may determine that a change (e.g., an increase) in the signal strength at the first location is caused by a new base station being deployed at the first location (instead of determining that the change is caused by a wireless communication repeater relaying wireless communications).

Figure 1E:
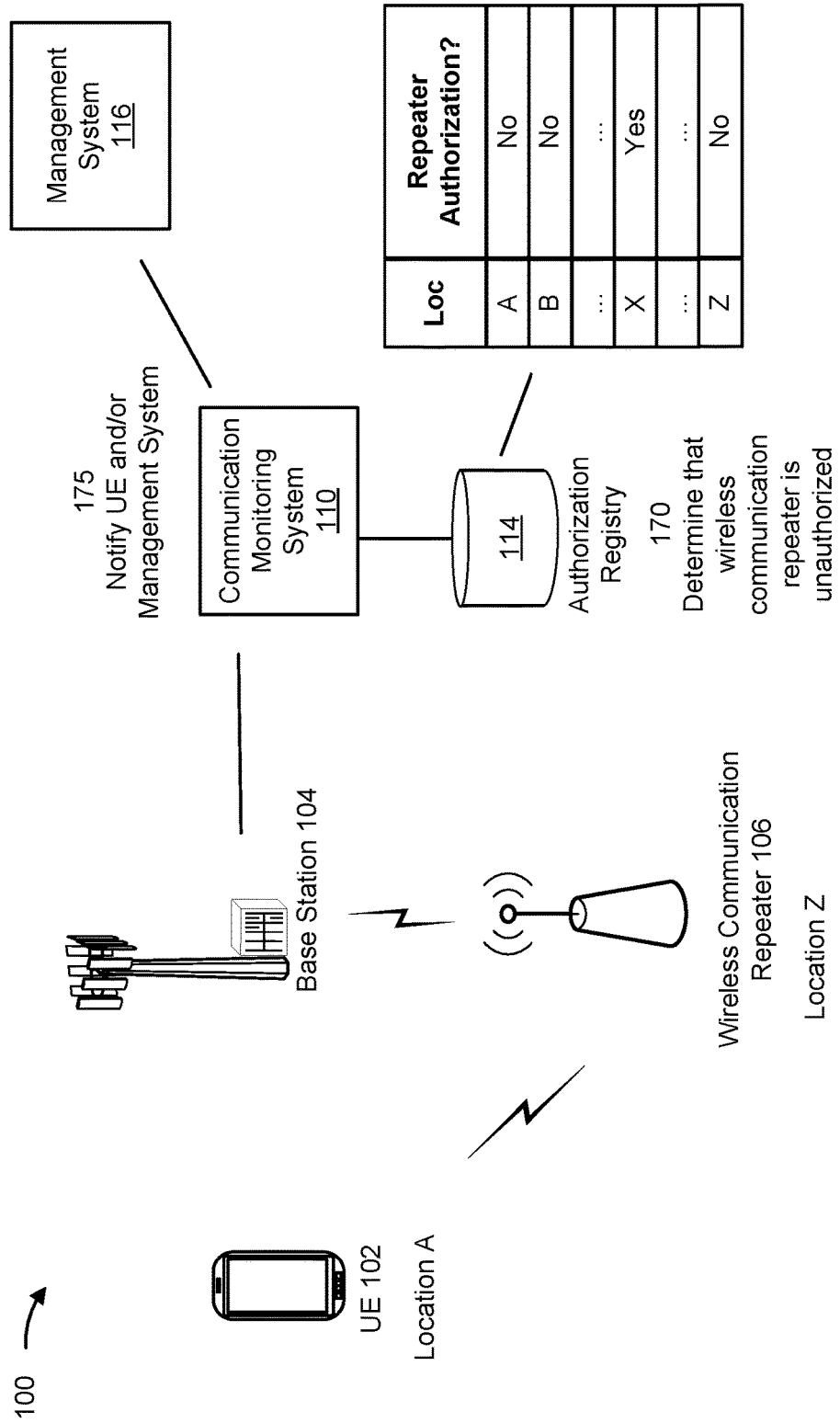

As shown in FIG. 1E, and by reference number 170, the communication monitoring system 110 may determine that the wireless communication repeater 106 is unauthorized. For example, the communication monitoring system 110 may determine that the wireless communication repeater 106 is unauthorized at the destination location. In some implementations, the communication monitoring system 110 may determine a location associated with the wireless communication repeater 106 (e.g., the destination location). In some examples, the communication monitoring system 110 may determine the location associated with the wireless communication repeater 106 as a location within a threshold distance of the first location. The communication monitoring system 110 may determine the threshold distance based on the signal strength and/or the timing advance distance (e.g., identified in the information regarding the wireless communication).

Additionally, or alternatively, to determining the location as a location within the threshold distance of the first location, the communication monitoring system 110 may determine the location associated with the wireless communication repeater 106 based on a ratio of the signal strength and the timing advance distance (e.g., identified in the information regarding the wireless communication). Additionally, or alternatively, the communication monitoring system 110 may determine the location associated with the wireless communication repeater 106 based on the location of the base station 104 and/or the location of the UE 102 (e.g., based on a triangulation using the location of the base station 104 and/or the location of the UE 102).

The communication monitoring system 110 may determine whether the location associated with the wireless communication repeater 106 (e.g., the destination location) is a location associated with an authorized wireless communication repeater. For example, the communication monitoring system 110 may search the authorization registry 114 (e.g., using information identifying the destination location) to determine whether the authorization registry 114 includes information indicating that the destination location is a location associated with an authorized wireless communication repeater.

As shown in FIG. 1E, the authorization registry 114 indicates that the first location (e.g., location A) is not a location associated with an authorized wireless communication repeater and indicates that the destination location (e.g., location Z) is not a location associated with an authorized wireless communication repeater. In this regard, the communication monitoring system 110 may notify UEs (located within a threshold distance of location A or location Z) and/or law enforcement agencies when the communication monitoring system 110 detects a wireless communication repeater located at location A or at location Z.

As shown in FIG. 1E, the authorization registry 114 indicates that a third location (e.g., location X) is a location associated with an authorized wireless communication repeater. In this regard, the communication monitoring system 110 may not notify UEs (located within a threshold distance of location X) and/or law enforcement agencies when the communication monitoring system 110 detects a wireless communication repeater located at location X. In some implementations, location X may be associated with a third cell of the base station 104 or associated with a different section of the first cell or the second cell of the base station 104.

In some implementations, the authorization registry 114 may be associated with one or more law enforcement agencies. In this regard, the information stored in the authorization registry 114 may be provided to the authorization registry 114 by the one or more law enforcement agencies. For example, the one or more law enforcement agencies may provide, to the authorization registry 114 for storage, information identifying locations (e.g., information regarding portions of the grid system and/or geolocation coordinates) and information indicating whether the locations are associated with authorized wireless communication repeaters (hereinafter "repeaters location information"). Additionally, or alternatively, the one or more law enforcement agencies may provide the repeaters location information to the communication monitoring system 110 to cause the communication monitoring system 110 to store the repeaters location information in the authorization registry 114, in a manner similar to the manner described above.

Based on searching the authorization registry 114, the communication monitoring system 110 may determine that the location associated with the wireless communication repeater 106 (e.g., location Z) is not a location associated with an authorized wireless communication repeater. For example, the communication monitoring system 110 may determine that the wireless communication repeater 106 is not authorized to receive the wireless communication at the location (e.g., location Z), within a threshold distance of the location (e.g., location Z) and/or within a cell (of the base station 104) corresponding to the location (e.g., location Z).

As shown in FIG. 1E, and by reference number 175, the communication monitoring system 110 may notify the UE 102 and/or the management system 116. For example, the communication monitoring system 110 may notify the UE 102 and/or the management system 116 based on determining that the wireless communication repeater 106 is unauthorized in the destination location. In some implementations, the communication monitoring system 110 may send a notification to the UE 102 to indicate that the wireless communication repeater 106 has received the wireless communication of the UE 102. The notification may be provided to the UE 102 via the base station 104 and/or via the wireless communication repeater 106.

The notification may include information identifying the location of the wireless communication repeater 106, an instruction to shut down the UE 102, an instruction to disconnect from the wireless communication repeater 106 and connect the base station 104 (or to another base station), an instruction to add information identifying the wireless communication repeater 106 to a list of devices to which the UE 102 is not to connect (e.g., a black list), an instruction to verify that the UE 102 is connected to the base station 104 (or to another base station) before transmitting additional wireless communications, an instruction to transmit an alert to a device of a law enforcement agency (e.g., the instruction may include an identifier of the device such as a telephone number or a network address), an instruction to prevent the UE 102 from transmitting additional wireless communications to the wireless communication repeater 106, among other examples. The actions, in the instructions above, may be performed by a user of the UE 102 and/or may be performed automatically by the UE 102 based on the instruction from the communication monitoring system 110 (e.g., the communication monitoring system 110 may cause the UE 102 to perform the action without user intervention).

Additionally, or alternatively, to sending the notification, the communication monitoring system 110 may send an alert to the management system 116 to indicate a location of the wireless communication repeater 106. For example, the alert may include the information identifying the location of the wireless communication repeater 106. The management system 116 may be associated with the mobile network operator and/or associated with a law enforcement agency. When the management system 116 is associated with the mobile network operator, the alert may cause the management system 116 to send a notification to a device of a law enforcement agency or to a device of a network technician to take action in the wireless network to mitigate or obviate the wireless communication repeater 106.

By detecting that the wireless communication repeater 106 is unauthorized in the destination location and by notifying the UE 102 and/or the management system 116, the communication monitoring system 110 may preserve computing resources, network resources, and/or other resources that would have otherwise been used to recover personal data received by the wireless communication repeater 106, to protect additional personal data from being received by the wireless communication repeater 106, and/or to restore network performance of the wireless network with which the base station 104 is associated.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
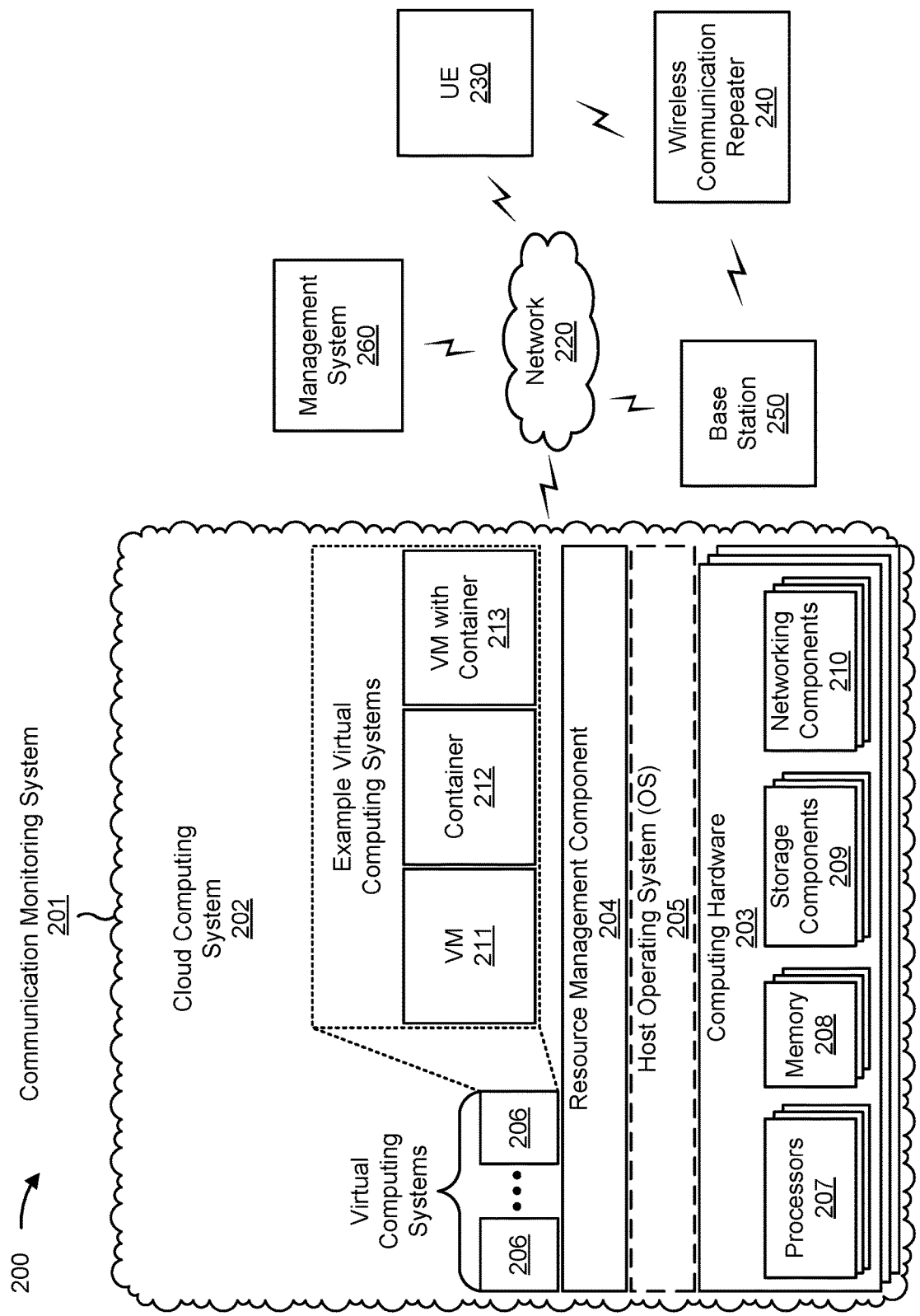
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a communication monitoring system 201 (which may be same as or similar to the communication monitoring system 110 described above), which may include one or more elements of and/or may execute within a cloud computing system 202. The cloud computing system 202 may include one or more elements 203-213, as described in more detail below. As further shown in FIG. 2, environment 200 may include a network 220, a UE 230 (which may be same as or similar to the UE 102 described above), a wireless communication repeater 240 (which may be same as or similar to the wireless communication repeater 106 described above), a base station 250 (which may be same as or similar to the base station 104 described above), and/or a management system 260 (which may be same as or similar to the management system 116 described above). Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the communication monitoring system 201 may include one or more elements 203-213 of the cloud computing system 202, may execute within the cloud computing system 202, and/or may be hosted within the cloud computing system 202, in some implementations, the communication monitoring system 201 may not be cloud-based (e.g., may be implemented outside of a cloud computing system) or may be partially cloud-based. For example, the communication monitoring system 201 may include one or more devices that are not part of the cloud computing system 202, such as device 300 of FIG. 3, which may include a standalone server or another type of computing device. The communication monitoring system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

The UE 230 may include one or more devices capable of communicating with base station 250 and/or a network (e.g., network 220). For example, UE 230 may include a wireless communication device, an IoT device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. The UE 230 may send traffic to and/or receive traffic from network 220 (e.g., via base station 250).

The wireless communication repeater 240 may include one or more devices capable of receiving traffic transmitted by the UE 230 and providing (or relaying) the received traffic to the base station 250.

The base station 250 may include one or more devices capable of transferring traffic, such as audio, video, text, and/or other traffic, destined for and/or received from UE 230. In some implementations, base station 250 may include an eNB or a gNB that receives traffic from and/or sends traffic to network 220. Additionally, or alternatively, one or more base stations 250 may be associated with a RAN that is not associated with the EPS. Base station 250 may send traffic to and/or receive traffic from UE 230 via an air interface. In some implementations, base station 250 may include a small cell base station, such as a base station of a microcell, a picocell, and/or a femtocell.

In some implementations, base station 250 may perform scheduling and/or resource management for UE 230 covered by base station 250 (e.g., UE 230 within an area covered by base station 250). In some implementations, base station 250 may be controlled or coordinated by a network controller, which can perform load balancing, network-level configuration, and/or the like. The network controller may include an OAM module or component, a self-organizing network (SON) module or component, and/or a similar module or component. The network controller may communicate with base station 250 via a wireless or wireline backhaul. In some implementations, base station 250 may include a network controller and perform network control, scheduling, and/or network management functions (e.g., for other base stations 250 and/or for uplink, downlink, and/or sidelink communications of UE 230 covered by base station 250). In some implementations, base station 250 may include a central unit and multiple distributed units. The central unit may coordinate access control and communication with regard to the multiple distributed units. The multiple distributed units may provide UE 230 and/or other base stations 250 with access to network 220.

The management system 260 may include one or more devices capable of transmitting a notification regarding unauthorized wireless communication repeaters to the UE 230 and/or to one or more devices of a law enforcement agency.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
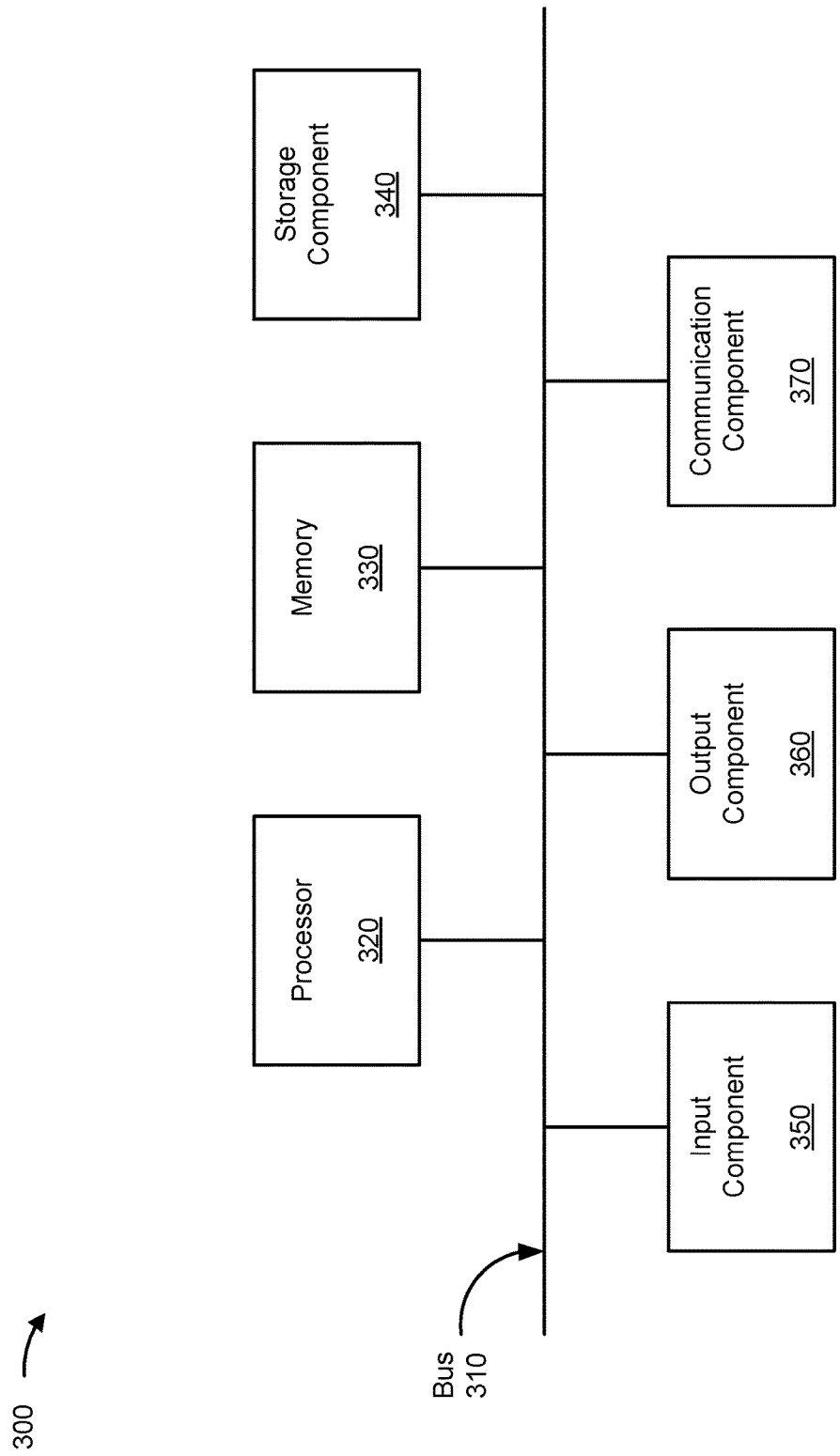
FIG. 3 is a diagram of example components of one or more devices of FIG. 2.

FIG. 3 is a diagram of example components of one or more devices of FIG. 2. For example, the example components may be components of a device 300, which may correspond to a communication monitoring system 201, a UE 230, a wireless communication repeater 240, a base station 250, and/or a management system 260. In some implementations, the communication monitoring system 201, the UE 230, the wireless communication repeater 240, the base station 250, and/or the management system 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 process relating to detecting a wireless communication repeater. In some implementations, one or more process blocks of FIG. 4 may be performed by a device (e.g., communication monitoring system 110 or communication monitoring system 201). In some implementations, one or more process blocks of FIG. 4 may be performed by another device or a group of devices separate from or including the device, such as a UE (e.g., UE 102 or UE 230), a wireless communication repeater (e.g., wireless communication repeater 106 or wireless communication repeater 240), a base station (e.g., base station 104 or base station 250) and/or a management system (e.g., management system 116 or management system 260). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a wireless communication associated with a user equipment having a location within a wireless network (block 410). For example, the device may receive a wireless communication associated with a user equipment having a location within a wireless network, as described above.

As further shown in FIG. 4, process 400 may include identifying a value of a parameter of the wireless communication (block 420). For example, the device may identify a value of a parameter of the wireless communication, as described above. In some implementations, the value is identified in the wireless communication. In some implementations, the value comprises at least one of a signal strength of a signal received by the user equipment, or a timing advance of the wireless communication.

As further shown in FIG. 4, process 400 may include obtaining an expected value of the parameter that is associated with the location of the user equipment (block 430). For example, the device may obtain an expected value of the parameter that is associated with the location of the user equipment, as described above. In some implementations, the location of the user equipment is determined based on a location of a base station that received the wireless communication.

In some implementations, the expected value may be associated with a historical measurement of the parameter at the location or within a threshold distance of the location (e.g., within a portion of the grid system described above). In some implementations, the expected value of the parameter may be associated with a previous value of the parameter from a previous wireless communication received from the UE by the base station. The previous wireless communication may be a wireless communication that was not relayed by the wireless communication repeater.

In some implementations, the expected value may be associated with a historical value of the parameter of a previous communication associated with another UE at the location. The previous wireless communication may be a wireless communication that was not relayed by the wireless communication repeater. In some examples, the historical measurement may be mapped with a portion of the grid system that is associated with the location of the UE.

As further shown in FIG. 4, process 400 may include determining that a difference between the value and the expected value of the parameter satisfies a threshold difference (block 440). For example, the device may determine that a difference between the value and the expected value of the parameter satisfies a threshold difference, as described above.

As further shown in FIG. 4, process 400 may include determining, based on the difference satisfying the threshold difference, that the wireless communication was relayed via a wireless communication repeater that received the wireless communication from the user equipment (block 450). For example, device may determine, based on the difference satisfying the threshold difference, that the wireless communication was relayed via a wireless communication repeater that received the wireless communication from the user equipment, as described above.

As further shown in FIG. 4, process 400 may include determining that the wireless communication repeater is unauthorized to relay the wireless communication in association with the location of the user equipment (block 460). For example, the device may determine that the wireless communication repeater is unauthorized to relay the wireless communication in association with the location of the user equipment, as described above.

In some implementations, determining that the wireless communication repeater is unauthorized to relay the wireless communication comprises accessing a registry of locations associated with authorized wireless communication repeaters, determining that the location of the user equipment is not associated with a location identified in the registry of locations, and determining that the wireless communication repeater is unauthorized to relay the wireless communication based on the location not being identified in the registry.

As further shown in FIG. 4, process 400 may include performing an action based on determining that the wireless communication repeater is unauthorized to relay the wireless communication (block 470). For example, the device may perform an action based on determining that the wireless communication repeater is unauthorized to relay the wireless communication, as described above.

In some implementations, performing the action comprises at least one of sending a notification to the user equipment to indicate that the wireless communication repeater received the wireless communication, or sending an alert to a management system to indicate a location of the wireless communication repeater.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, a wireless communication associated with a user equipment having a location within a wireless network;
    identifying, by the device, a value of a parameter of the wireless communication;
    obtaining, by the device, an expected value of the parameter that is associated with the location of the user equipment;
    determining, by the device, that a difference between the value and the expected value of the parameter satisfies a threshold difference;
    determining, by the device and based on the difference satisfying the threshold difference, that the wireless communication was relayed via a wireless communication repeater that received the wireless communication from the user equipment;
    determining, by the device, that the wireless communication repeater is unauthorized to relay the wireless communication;
        wherein determining that the wireless communication repeater is unauthorized to relay the wireless communication is based on determining that the location of the user equipment is not associated with a location identified in a registry of locations; and
    performing, by the device, an action based on determining that the wireless communication repeater is unauthorized to relay the wireless communication.

2. The method of claim 1, wherein the value is identified in the wireless communication.

3. The method of claim 1, wherein the parameter comprises at least one of:
    a signal strength of a signal received by the user equipment; or
    a timing advance of the wireless communication.

4. The method of claim 1, wherein the location of the user equipment is determined relative to a location of a base station that received the wireless communication.

5. The method of claim 1, wherein the expected value is associated with one or more previous values of the parameter from one or more previous wireless communications received from one or more user equipment at the location.

6. The method of claim 1, wherein determining that the wireless communication repeater is unauthorized to relay the wireless communication comprises:
    accessing the registry of locations associated with authorized wireless communication repeaters;
    determining that the location of the user equipment is not associated with the location identified in the registry of locations; and
    determining that the wireless communication repeater is unauthorized to relay the wireless communication based on the location not being identified in the registry.

7. The method of claim 1, wherein performing the action comprises at least one of:
    sending a notification to the user equipment; or
    sending an alert to a management system indicating a location of the unauthorized repeater.

8. A device, comprising:
one or more processors configured to:
    receive a wireless communication that is provided to a wireless network by a user equipment;
    identify a value of a parameter of the wireless communication;
    obtain an expected value of the parameter;
    compare the value and the expected value;
    determine, based on comparing the value and the expected value, that the wireless communication was relayed by a wireless communication repeater;
    determine that the wireless communication repeater is unauthorized to relay the wireless communication,
        wherein the one or more processors are configured to:
            determine that the wireless communication repeater is unauthorized to relay the wireless communication based on determining that a location associated with the wireless communication repeater is not associated with a location identified in a registry that identifies locations of authorized wireless communication repeaters; and
    perform an action associated with the wireless communication repeater relaying the wireless communication and based on the wireless communication repeater being unauthorized to relay the wireless communication.

9. The device of claim 8, wherein the parameter comprises at least one of:
a signal strength; or
a timing advance.

10. The device of claim 8, wherein the one or more processors are further configured to:
prior to obtaining the expected value, determine a location of the user equipment,
    wherein the expected value is associated with a historical value of the parameter from a plurality of one or more user equipment at the location.

11. The device of claim 8, wherein the expected value is associated with a previous value of the parameter from a previous wireless communication received from the user equipment by a base station that received the wireless communication from the wireless communication repeater.

12. The device of claim 8, wherein the parameter is associated with a timing advance and a signal strength, and the expected value is associated with a previous wireless communication between the user equipment and a base station of the wireless network that received the wireless communication.

13. The device of claim 8, wherein the one or more processors are further configured to:
prior to performing the action, access the registry;
determine the location associated with the wireless communication repeater; and
determine whether the wireless communication repeater is authorized to relay the wireless communication based on whether the location associated with the wireless communication repeater is identified in the registry,
    wherein the action is performed based on determining whether the wireless communication repeater is authorized to relay the wireless communication.

14. The device of claim 8, wherein the one or more processors, when performing the action, are configured to:
send a notification to the user equipment to indicate that the wireless communication repeater is unauthorized; or
send an alert to a management system to indicate the location of the wireless communication repeater that is unauthorized.

15. A non-transitory computer-readable medium storing a set of instructions, the set of instructions comprising:
one or more instructions that, when executed by one or more processors of a device, cause the device to:
    receive a wireless communication associated with a user equipment,
        wherein the user equipment has a location within a wireless network;
    identify a value of a parameter of the wireless communication;
    compare the value of the parameter with an expected value of the parameter;
    determine, based on comparing the value and the expected value, a probability that the wireless communication was relayed from a wireless communication repeater that received the wireless communication from the user equipment;
    determine, based on the probability indicating that the wireless communication was relayed from the wireless communication repeater, that the wireless communication repeater is unauthorized to relay the wireless communication,
        wherein the one or more instructions, that cause the one or more processors to determine that the wireless communication repeater is unauthorized to relay the wireless communication, cause the one or more processors to:
            determine that the wireless communication repeater is unauthorized to relay the wireless communication based on determining that a location associated with the wireless communication repeater is not associated with a location identified in a registry that identifies locations of authorized wireless communication repeaters; and
    perform an action to mitigate or obviate the wireless communication repeater based on the wireless communication repeater being unauthorized to relay the wireless communication.

16. The non-transitory computer-readable medium of claim 15, wherein the parameter is associated with an operations, administration, and management parameter that monitors signal characteristics between the user equipment and a base station.

17. The non-transitory computer-readable medium of claim 15, wherein the expected value is determined based on the location of the user equipment within the wireless network.

18. The non-transitory computer-readable medium of claim 15, wherein the expected value is associated with a historical value of the parameter of a previous wireless communication associated with another user equipment,
wherein the historical value is mapped with a geographical grid that is associated with the location of the user equipment.

19. The non-transitory computer-readable medium of claim 15, wherein the one or more instructions, that cause the device to perform the action, cause the device to:
send a notification to the user equipment to indicate that the wireless communication repeater received the wireless communication; or send an alert to a management device to indicate the location of the wireless communication repeater.

20. The non-transitory computer-readable medium of claim 15, wherein the one or more instructions further cause the device to:
  prior to performing the action, accessing the registry;
  determine the location associated with the wireless communication repeater; and
  determine whether the wireless communication repeater is authorized to relay the wireless communication based on whether the location associated with the wireless communication repeater is identified in the registry,
    wherein the action is performed based on determining that the wireless communication repeater is unauthorized to relay the wireless communication.

* * * * *